No. 877,262. PATENTED JAN. 21, 1908.
C. P. TOWNSEND.
METHOD OF PURIFYING STANNIC CHLORID.
APPLICATION FILED JAN. 27, 1906.
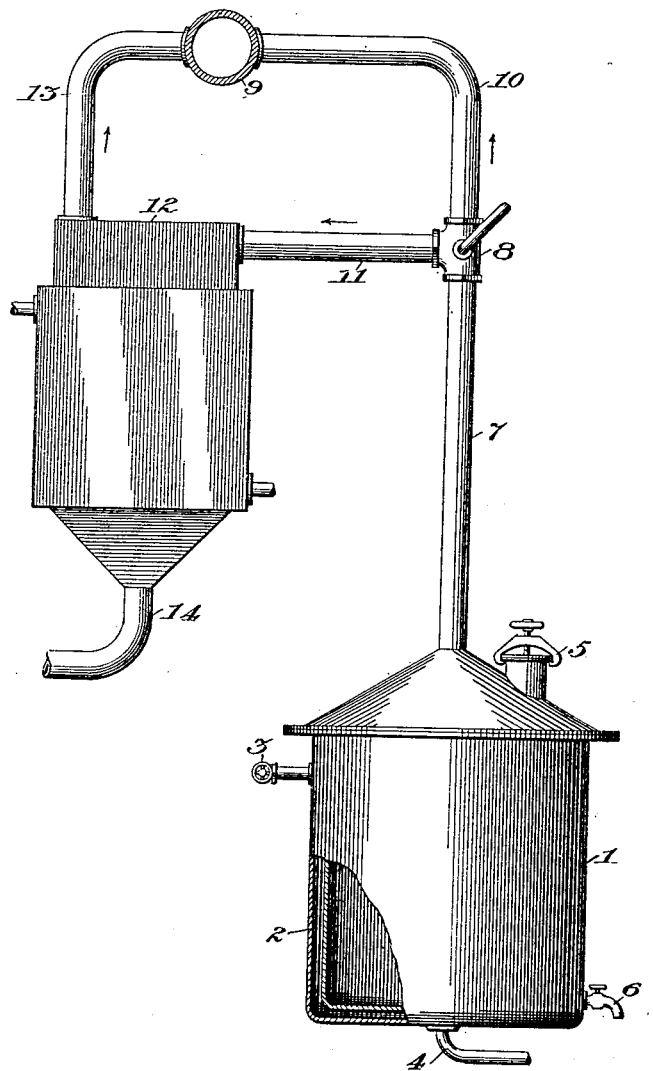

UNITED STATES PATENT OFFICE.

CLINTON PAUL TOWNSEND, OF WASHINGTON, DISTRICT OF COLUMBIA, ASSIGNOR TO CHEMICAL REDUCTION COMPANY, OF NEW YORK, N. Y., A CORPORATION OF NEW YORK.

METHOD OF PURIFYING STANNIC CHLORID.

No. 877,332.

Specification of Letters Patent.

Patented Jan. 21, 1908.

Application filed January 27, 1906. Serial No. 298,253.

*To all whom it may concern:*

Be it known that I, CLINTON PAUL TOWNSEND, a citizen of the United States, residing at Washington, in the District of Columbia, have invented certain new and useful Improvements in Method of Purifying Stannic Chlorid, of which the following is a specification.

This invention is a method of purifying stannic chlorid such as has been produced by reaction between chlorin and a material consisting wholly or in part of metallic tin, and hereinafter referred to as a tin-bearing material, as, for instance, by the method set forth in my application serial number 235,765, filed December 6, 1904, or by any other method which involves the use of chlorin whether as a gas or in solution, in excess of the quantity which enters into chemical combination with the tin. In all such cases the product is stannic chlorid which is anhydrous if the reagents are free from moisture, but which contains a very considerable proportion of uncombined chlorin, usually sufficient to impart to it a yellow color. Hydrochloric acid may also be present in greater or less quantity if it accompanies the chlorin used for the production of the chlorid. If, as is usually the case, there is some moisture present, a corresponding amount of hydrated stannic chlorid will be formed; the hydrated chlorid is liquid at temperatures exceeding 80° C., is capable of dissolving chlorin, sublimes freely in a current of chlorin or stannic chlorid vapors, and acts in general in a manner closely analogous to the anhydrous chlorid. The term "stannic chlorid" is employed herein as indicating either the anhydrous or hydrated salts or any mixture of these.

A chlorinated liquid of this character may be partially purified by treatment with metallic tin to absorb chlorin, followed by distillation; the product thus obtained is, however, unsuited for technical use for the reason that the absorption of the chlorin is not complete and the residual chlorin is found in the distillate. I have found that stannic chlorid substantially free from chlorin or other impurities and available for technical use may be readily prepared in a very simple manner and without loss of product.

For a full understanding of the invention reference is made to the accompanying drawings in which the figure is a side elevation of an apparatus suitable for carrying out my method.

1 represents a still of any preferred construction, illustrated as a cylindrical vessel having a jacket 2 with steam and drip connections 3, 4, a charging aperture 5 provided with a suitable closure, and a draw-off cock 6. The vapor pipe 7 is provided with a 2-way cock 8 by which communication may be established with a main 9 by either one of two paths: the vapors may be led directly to the main through pipe 10, or they may be directed through pipe 11 to a condenser 12 of any approved form, said condenser communicating through pipe 13 with the main 9. This main 9 leads to a reaction vessel for the production of stannic chlorid, by reaction between chlorin and metallic tin, and serves as a supply of chlorin therefor. It will be understood that the pressure in the main 9 is normally below that in the still 1 so that the movement of vapors is as indicated by the arrows upon the figure.

In the operation of the apparatus shown the still is supplied with stannic chlorid containing chlorin, and communication is established through pipes 7 and 10 with the main 9. Heat is then applied to the still and the temperature of the liquid is gradually raised, thereby expelling chlorin, which is conducted as above mentioned into presence of tin for the production of further quantities of stannic chlorid; this expelled chlorin always carries a certain proportion of stannic chlorid, such proportion being, however, quite small and quite immaterial inasmuch as it is directly recovered when the chlorin is brought into reacting relation with tin. Heat is preferably supplied to the material in the still 1 at such rate that before the boiling point of the liquid is reached the chlorin is completely expelled. The cock 8 is then shifted and the vapors of stannic chlorid are led through the condenser 12, the condensed product being withdrawn through pipe 14 or otherwise. Pipe 13 affords a passage for any non-condensable gases or for any uncondensed stannic chlorid to the main 9. It will be noted that the vapor pipe 7 leading from the still is of considerable length which is of advantage as permitting a partial condensation of the vapors of stannic chlorid, such condensed vapors being returned to the main body of liquid.

The above apparatus is described by way of example only and it will be understood that the operation may be variously modified. For instance, the chlorin which is expelled from the liquid in the still may be led to the main 9 through the condenser 12, the last portions being displaced from the condenser by the vapors of stannic chlorid. The stannic chlorid remaining in the vessel 1 after removal of the chlorin is often of sufficient purity for technical use and in such case is not distilled but is withdrawn through draw-off cock 6. As a further modification of the method I may add metallic tin or a material containing it to the chlorinated liquid in the vessel 1, in which case the chlorin is in part taken up by the tin with the production of stannic chlorid and in part expelled; or the chlorinated liquor may first be treated with metallic tin and afterward freed from chlorin by heating.

I claim:—

1. The method of purifying stannic chlorid from chlorin, which consists in combining a portion of the chlorin with tin and expelling the uncombined portion.

2. The method of purifying stannic chlorid from chlorin, which consists in first combining a portion of the chlorin with tin and then expelling the uncombined portion.

3. The method of treating stannic chlorid containing chlorin, which consists in purifying the stannic chlorid by combining a portion of the chlorin with tin and expelling the uncombined portion, and bringing the separated chlorin into contact with a tin-bearing material.

In testimony whereof, I affix my signature in presence of two witnesses.

CLINTON PAUL TOWNSEND.

Witnesses:
C. W. FOWLER,
J. B. HILL.